(12) United States Patent
Tanaka et al.

(10) Patent No.: US 10,093,134 B2
(45) Date of Patent: Oct. 9, 2018

(54) PNEUMATIC TIRE

(71) Applicant: Sumitomo Rubber Industries, Ltd., Kobe-shi, Hyogo (JP)

(72) Inventors: Satoshi Tanaka, Kobe (JP); Tadashi Ito, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 775 days.

(21) Appl. No.: 14/265,618

(22) Filed: Apr. 30, 2014

(65) Prior Publication Data

US 2014/0345767 A1 Nov. 27, 2014

(30) Foreign Application Priority Data

May 27, 2013 (JP) .................................. 2013-111155
Jul. 2, 2013 (JP) .................................. 2013-139134

(51) Int. Cl.
*B60C 11/12* (2006.01)
*B60C 11/03* (2006.01)
*B60C 11/13* (2006.01)

(52) U.S. Cl.
CPC ...... *B60C 11/1263* (2013.01); *B60C 11/0306* (2013.01); *B60C 11/1204* (2013.01); *B60C 11/1369* (2013.01); *B60C 2011/1213* (2013.01); *B60C 2011/1268* (2013.01); *B60C 2200/06* (2013.01)

(58) Field of Classification Search
CPC ............. B60C 11/1263; B60C 11/1204; B60C 11/1369; B60C 2011/1268; B60C 2011/1213; B60C 11/12
See application file for complete search history.

(56) References Cited

U.S. PATENT DOCUMENTS 5,814,169 A * 9/1998 Yamaguchi ............. B60C 11/11
152/209.2
6,000,450 A * 12/1999 Kishimoto ............... B60C 11/00
152/209.1

(Continued)

FOREIGN PATENT DOCUMENTS

JP 62-146703 A * 6/1987
JP 11-321234 A * 12/1999

(Continued)

OTHER PUBLICATIONS

Machine translation for Japan 2012-011690 (no date).*

(Continued)

*Primary Examiner* — Steven D Maki
(74) *Attorney, Agent, or Firm* — Birch, Stewart, Kolasch & Birch, LLP

(57) ABSTRACT

A pneumatic tire comprises a tread portion provided with blocks each provided with a first variable depth sipe and a second variable depth sipe each having both axial ends opened at edges of the block on both sides thereof in the tire axial direction. In each block, a shallow portion of the first variable depth sipe overlaps, in the tire axial direction, with a deep main portion of the second variable depth sipe. an axial groove dividing the blocks is provided with a tie bar overlapping, in the tire axial direction, with the deep main portion of the adjacent variable depth sipe.

10 Claims, 11 Drawing Sheets

(56) References Cited

U.S. PATENT DOCUMENTS

| | | | |
|---|---|---|---|
| D621,341 S * | 8/2010 | Cerny | D12/577 |
| D712,819 S * | 9/2014 | Yamakawa | D12/600 |
| 2011/0083777 A1* | 4/2011 | Hidrot | B60C 11/12 |
| | | | 152/209.17 |
| 2012/0006456 A1* | 1/2012 | Koshio | B60C 11/11 |
| | | | 152/209.18 |

FOREIGN PATENT DOCUMENTS

| | | | |
|---|---|---|---|
| JP | 2004-217058 A * | 8/2004 | |
| JP | 2007-153275 A * | 6/2007 | |
| JP | 2009-190677 A | 8/2009 | |
| JP | 2010-274846 A * | 12/2010 | |
| JP | 2012-011690 A * | 1/2012 | |
| WO | WO 2012/072404 A1 | 6/2012 | |

OTHER PUBLICATIONS

Machine translation for Japan 2010-274846 (no date).*
Machine translation for Japan 2007-153275 (no date).*
Machine translation for Japan 2004-217058 (no date).*
Machine translation for Japan 11-321234 (no date).*
Machine translation for Japan 62-146703 (no date).*
Extended European Search Report dated Sep. 16, 2014, in European Patent Application No. 14166433.4.

* cited by examiner

PNEUMATIC TIRE

BACKGROUND OF THE INVENTION

The present invention relates to a pneumatic tire, more particularly to a tread pattern including variable depth sipes capable of improving wear resistance of the tread without sacrificing tire performance on ice.

In order to improve running performance on snowy and icy roads, pneumatic tires for heavy duty vehicles such as truck and bus are usually provided with a block type tread pattern. Such a block type tread pattern often includes siped blocks in order to further improve running performance on ice (on-the-ice performance) for example as disclosed in Japanese Patent Application Publication No. 2009-190677.

In general, a siped block is reduced in the rigidity when compared with the non-siped block. Accordingly, its deformation and motion during running becomes larger. Therefore, a siped block is liable to wear easily.

In order to increase the wear resistance of a siped block, if the length and depth of the sipe are decreased, on-the-ice performance is naturally deteriorated.

SUMMARY OF THE INVENTION

It is therefore, an object of the present invention to provide a pneumatic tire in which the wear resistance can be improved without sacrificing on-the-ice performance.

According to the present invention, a pneumatic tire comprises a tread portion provided with blocks each provided with a first variable depth sipe and a second variable depth sipe each having both axial ends opened at edges of the block on both sides thereof in the tire axial direction, and each having a deep main portion having a substantially constant depth and a shallow portion, wherein in each of the blocks, the shallow portion of the first variable depth sipe overlaps, in the tire axial direction, with the deep main portion of the second variable depth sipe.

Therefore, a decrease in the rigidity of the siped block due to the deep main portion of the second variable depth sipe is compensated by the shallow portion the first variable depth sipe. Thus, the block has a uniform rigidity distribution and a good wear resistance although the block is provided with a plurality of sipes.

Further, the pneumatic tire may have the following feature:

with respect to two of the blocks circumferentially divided by an axial groove, the main portion of the variable depth sipe disposed in one of the two blocks adjacently to the axial groove overlaps, in the tire axial direction, with a tie bar formed in the axial groove so as to protrude from the groove bottom, and the tie bar overlaps, in the tire axial direction, with the main portion of the variable depth sipe disposed in the other block adjacently to the axial groove.

In this case, as the tie bar is disposed near the main portion of the sipe around which the decrease in the rigidity is relatively large, and compensates for such decrease, the rigidity distribution in the block row becomes uniform, and the wear resistance can be further improved.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflated to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

The tread edges Te are the axial outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

DESCRIPTION OF THE PREFERRED EMBODIMENTS

Embodiments of the present invention will now be described in detail in conjunction with the accompanying drawings.

Figure 1:
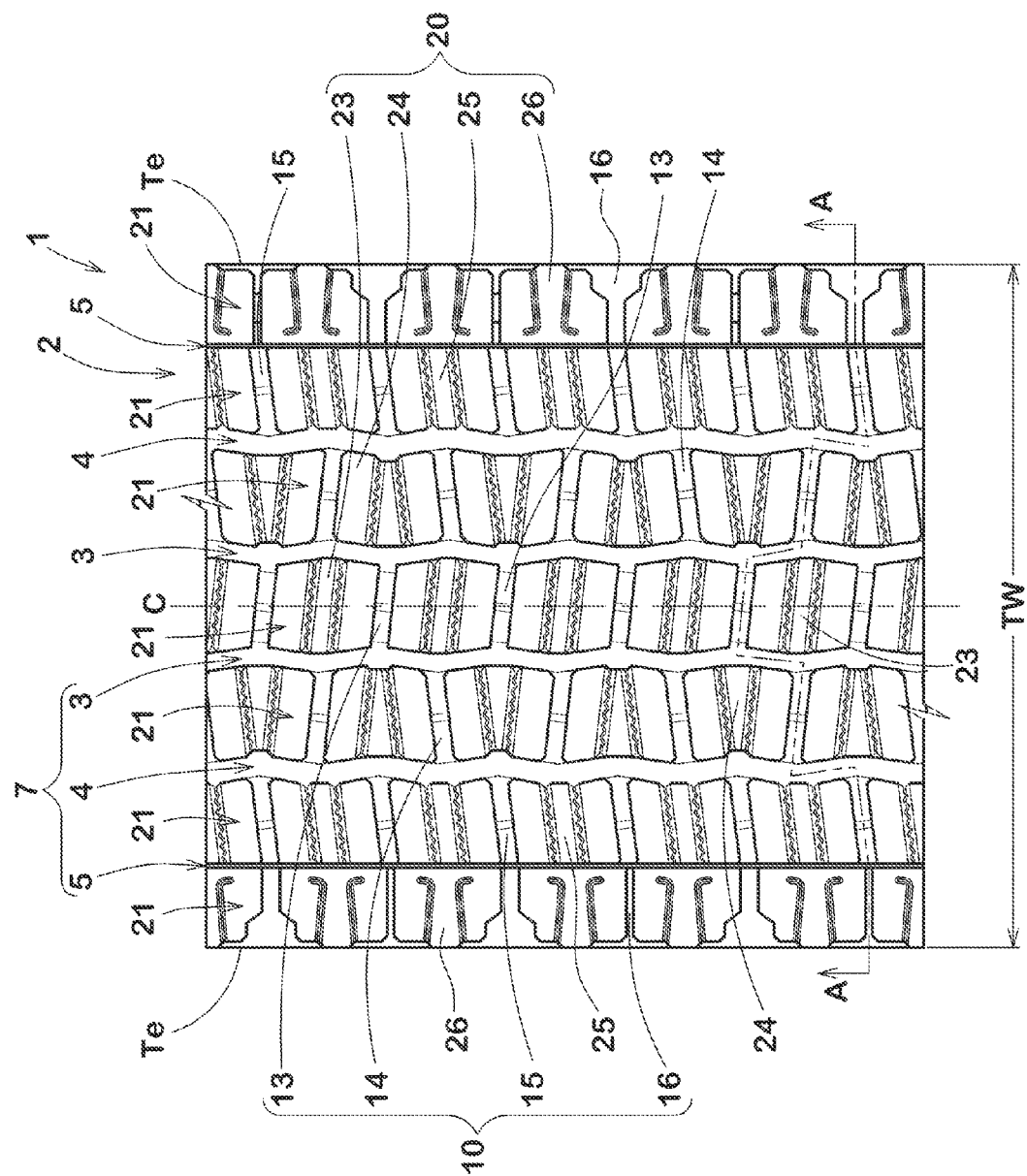
FIG. 1 is a developed partial view of a tread portion of a pneumatic tire according to the present invention.
Figure 2:
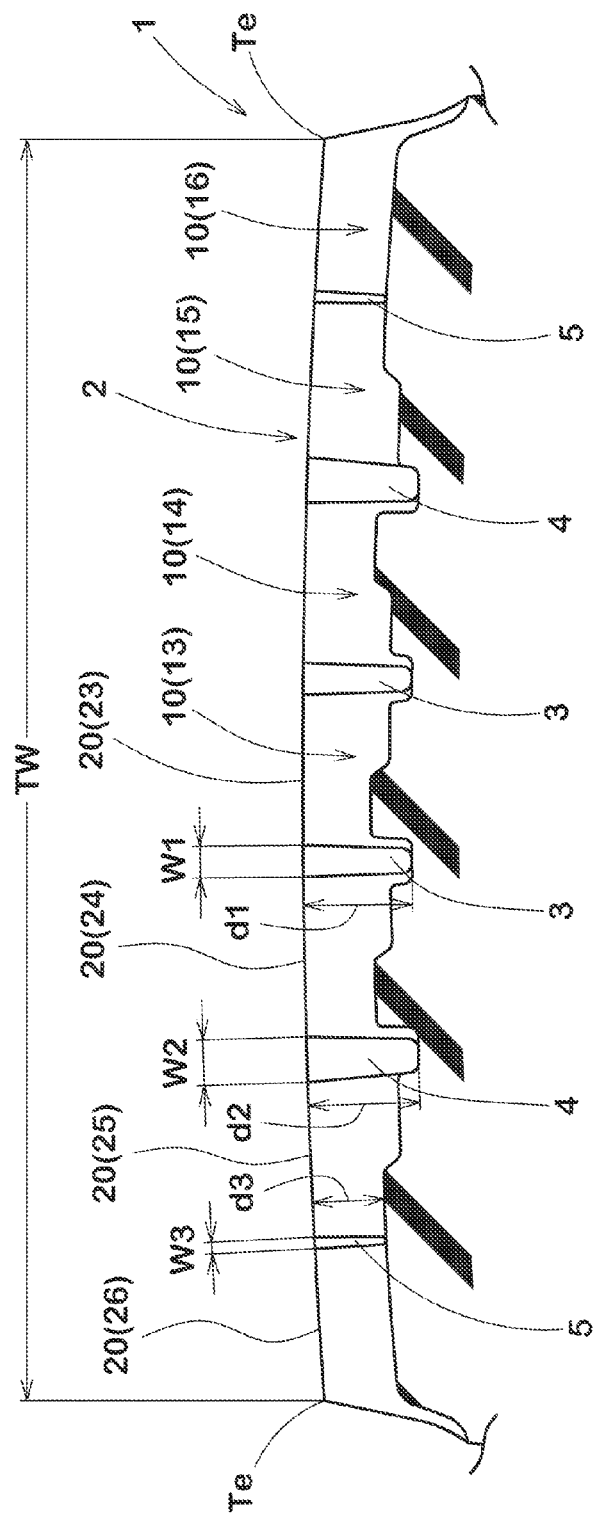
FIG. 2 is a cross sectional partial view of the tread portion taken along line A-A of FIG. 1.

FIG. 1 shows a part of the tread portion 2 of a pneumatic tire 1 as an embodiment of the present invention.

In this embodiment, the pneumatic tire 1 is designed as a winter tire for heavy duty vehicles such as truck and bus.

The tread portion 2 is provided with circumferential grooves 7 extending continuously in the tire circumferential direction and axial grooves 10 connecting therewith so as form a block type tread pattern having a land ratio Lr (the ratio of the total ground contacting area to the gross area of the tread portion 2).

The land ratio Lr is preferably set in a range of from not less than 74%, more preferably not less than 70%, but not more than 84%, more preferably not more than 80%.

If the land ratio Lr is less than 74%, there is a possibility that the steering stability is deteriorated. If the land ratio is more than 84%, there is a possibility that the wet performance is deteriorated.

In this embodiment, the circumferential grooves 7 are two wide main grooves and one narrow groove disposed on each side of the tire equator C, which are an axially innermost crown main groove 3, an axially outermost shoulder narrow groove 5 and a middle main groove 4 therebetween.

In this embodiment, each of the crown main grooves 3 is a zigzag groove. But, it is also possible that the crown main grooves 3 are a straight groove.

In this embodiment, each of the middle main grooves 4 is a zigzag groove. But, it is also possible that the middle main grooves 4 are a straight groove.

If the crown main grooves 3 are decreased in the groove width and/or groove depth, there is a possibility that on-the-snow performance is deteriorated. If the crown main grooves 3 are increased in the groove width and/or groove depth, the rigidity of the tread portion 2 is decreased, and there is a possibility that the steering stability is deteriorated. Therefore, the groove width w1 of the crown main grooves 3 is preferably set in a range of from 3% to 7% of the tread width TW, and the groove depth d1 of the crown main grooves 3 is preferably set in a range of from 14.5 to 24.5 mm. For the similar reasons, the groove width w2 of the middle main grooves 4 is preferably set in a range of from 3% to 7% of the tread width TW, and the groove depth d2 of the middle main grooves 4 is preferably set in a range of from 14.5 to 24.5 mm.

In order to relatively increase the rigidity in the tread shoulder regions and thereby improve the steering stability, the groove width w3 of the shoulder narrow grooves 5 is preferably set in a range of from 0.10 to 0.15 times the groove width w2 of the middle main grooves 4, and the groove depth d3 of the shoulder narrow grooves 5 is preferably set in a range of from 0.50 to 0.70 times the groove depth d2 of the middle main grooves 4

In this embodiment, the axial grooves 10 are: center axial grooves 13 extending between the crown main grooves 3; middle axial grooves 14 extending between the crown main grooves 3 and the middle main grooves 4; inside shoulder axial grooves 15 extending between the middle main grooves 4 and the shoulder narrow grooves 5; and outside shoulder axial grooves 16 extending between the shoulder narrow grooves 5 and the tread edges Te.

The center axial grooves 13 each extend straight with a substantially constant width and each incline with respect to the tire axial direction.

The middle axial grooves 14 each extend straight with a substantially constant width and each incline with respect to the tire axial direction.

The inside shoulder axial grooves 15 each extend straight with a substantially constant width and each incline with respect to the tire axial direction.

The outside shoulder axial grooves 16 each extend substantially parallel with the axial direction.

The tread portion 2 is therefore, axially divided by the circumferential grooves 7 into a plurality of circumferential rows 21 of blocks 20 circumferentially divided by the axial grooves 10.

The blocks 20 are: a single row 21 of center blocks 23 defined by the crown main grooves 3 and the center axial grooves 13; two rows 21 of middle blocks 24 defined by the crown main grooves 3, the middle main grooves 4 and the middle axial grooves 14; two rows 21 of inside shoulder blocks 25 defined by the middle main grooves 4, the shoulder narrow grooves 5 and the inside shoulder axial grooves 15; and two rows 21 of outside shoulder blocks 26 defined by the shoulder narrow grooves 5 and the outside shoulder axial grooves 16.

In each of the rows 21, the number Nb of the blocks 20 is preferably not less than 70, more preferably not less than 74, but preferably not more than 84, more preferably not more than 80. If less than 70, the length of the edges of the blocks 20 decreases, and there is a possibility that on-the-ice performance is deteriorated. If more than 84, the blocks 20 become small, and there is a possibility that wear resistance is deteriorated.

The hardness Hb of the rubber forming the block 20 (namely, the hardness of the tread rubber) is preferably not less than 62 degrees, more preferably not less than 64 degrees, but not more than 70 degrees, more preferably not more than 68 degrees. If the hardness Hb is less than 62 degrees, there is a possibility that uneven wear resistance is decreased. If the hardness Hb is more than 70 degrees, there is a possibility that on-the-ice performance and on-the-snow performance are deteriorated.

In this specification, the hardness of rubber means the hardness measured with a type-A durometer according to Japanese Industrial standard K6253.

The blocks 20 are provided with sipes 30 extending generally in the tire axial direction.

In this application, the sipe means a cut or a fine groove not for purpose of drainage having a groove width of from 0.5 to 1.5 mm.

In this embodiment, the sipes 30 include zigzag or wavy sipes which has good water-absorbing property when compared with a straight sipe and can exert its edge effect in multi directions to improve tire performance on ice.

In this embodiment, the sipes 30 include open sipes whose both ends are opened at the edges 20e of the block on both sides of the block in the tire axial direction so as to exert a good edge effect and to expedite discharging of the absorbed water in the sipe toward the circumferential grooves 7. Thus, such open sipe has a good water-absorbing property.

In this embodiment, the sipes 30 also include semi-open sipes having an opened end and closed end.

Each of the blocks 20 is provided with a plurality of sipes 30 whose number Ns is preferably 2 to 4, more preferably 2 or 3.

In this embodiment, each block 20 is provided with two sipes 30 so that good edge effect can be obtained while maintaining the block rigidity, and both of the on-the-ice performance and the wear resistance can be achieved.

In this embodiment, the sipes 30 include variable depth sipes 35 each having a variable depth and having a deep main portion 36 and a shallow portion 37.

The main portion 36 has a substantially constant depth d4, and the total length of the main portion 36 is more than 50% of the entire length of the sipe along the sipe.

The shallow portion 37 has a depth d5 less than the depth d4 of the main portion 36 so that the variable depth sipe 35 can exert its good edge effect without substantially decreasing the rigidity of the block 20.

The depth d4 of the main portion 36 is set in a range of not less than 0.5 times, preferably not less than 0.55 times, but not more than 0.70 times, preferably not more than 0.60 times the groove depth d1 of the crown main grooves 3 in order that the variable depth sipe 35 exerts a good water-absorbing performance by its main portion 36 while maintaining the rigidity of the block 20. Thus, the wear resistance of the block 20 can be improved without sacrificing on-the-ice performance.

Preferably, the ratio d5/d4 of the depth d5 at the shallow portion 37 to the depth d4 at the main portion 36 is set in a range of not less than 0.24, more preferably not less than 0.30, but not more than 0.42, more preferably not more than 0.36. If less than 0.24, the bottom of the shallow portion 37 appears in the tread as a ground contacting face in an early stage of the tread wear life, therefore, the time period in which good on-the-ice performance can be obtained becomes short. If more than 0.42, it becomes difficult to improve the wear resistance of the block 20.

Preferably, the ratio L2/L1 of the axial length L2 of the shallow portion 37 to the axial length L1 of the variable depth sipe 35 is set in a range of not less than 0.10, more preferably not less than 0.15, but not more than 0.25, more preferably not more than 0.20.

If less than 0.10, it becomes difficult to maintain the rigidity of the block 20. If more than 0.25, there is a possibility that, when the wear reaches to the shallow portion 37, on-the-ice performance abruptly decreases.

Here, the axial length L2 is equal to the axial length L1 minus the total axial length of the deep main portion 36 having the depth d4.

According to the present invention, at least two kinds of the variable depth sipes 35 are disposed in one block 20.

In this embodiment, two kinds of the variable depth sipes 35 (hereinafter, first variable depth sipe 38 and second variable depth sipe 39) are disposed in one block 20.

Figure 3A:
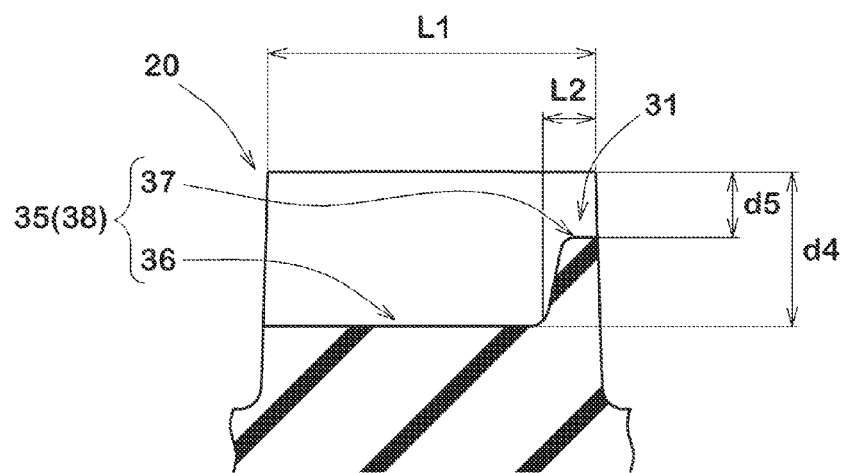
FIG. 3(a) is a cross sectional view of a block taken along the widthwise center of a first variable depth sipe (line B-B in FIG. 4).

The first variable depth sipe 38 is such that, as shown in FIG. 3(a), one shallow portion 37a is formed at its end 31 on one side in the tire axial direction.

Figure 3B:
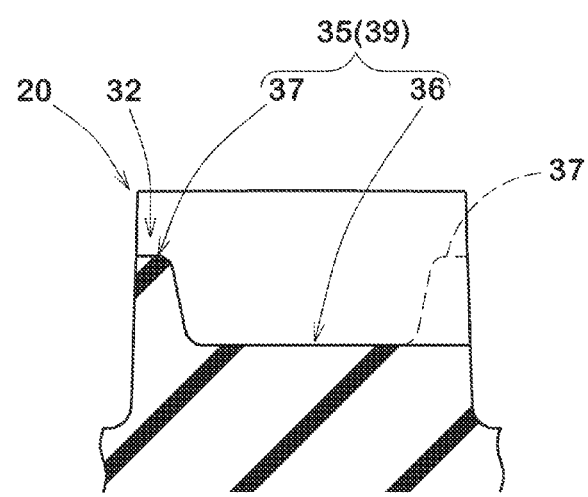
FIG. 3(b) is a cross sectional view of the block taken along the widthwise center of a second variable depth sipe (line C-C in FIG. 4).

The second variable depth sipe 39 is such that, as shown in FIG. 3(b), one shallow portion 37b is formed at its end 32 on the other side in the tire axial direction.

In each of the blocks 20 provided with the first variable depth sipe 38 and second variable depth sipe 39, the shallow portion 37 of the first variable depth sipe 38 and the deep main portion 36 of the second variable depth sipe 39 are aligned in the tire axial direction. In other words, they are overlapped with each other in the tire axial direction. Further, the deep main portion 36 of the first variable depth sipe 38 and the shallow portion 37 of the second variable depth sipe 39 are aligned in the tire axial direction. In other words, they are overlapped with each other in the tire axial direction. Accordingly, a decrease in the rigidity of the block 20 due to the main portion 36 of each variable depth sipe is compensated by the shallow portion 37 of the other variable depth sipe. Thus, the block 20 has a uniform rigidity distribution and a good wear resistance.

In the tread pattern shown in FIG. 1, the center blocks 23, the middle blocks 24 and the inside shoulder blocks 25 are provided with the variable depth sipes 35 as the wavy sipes and also as the open sipes as explained above.

Figure 4:
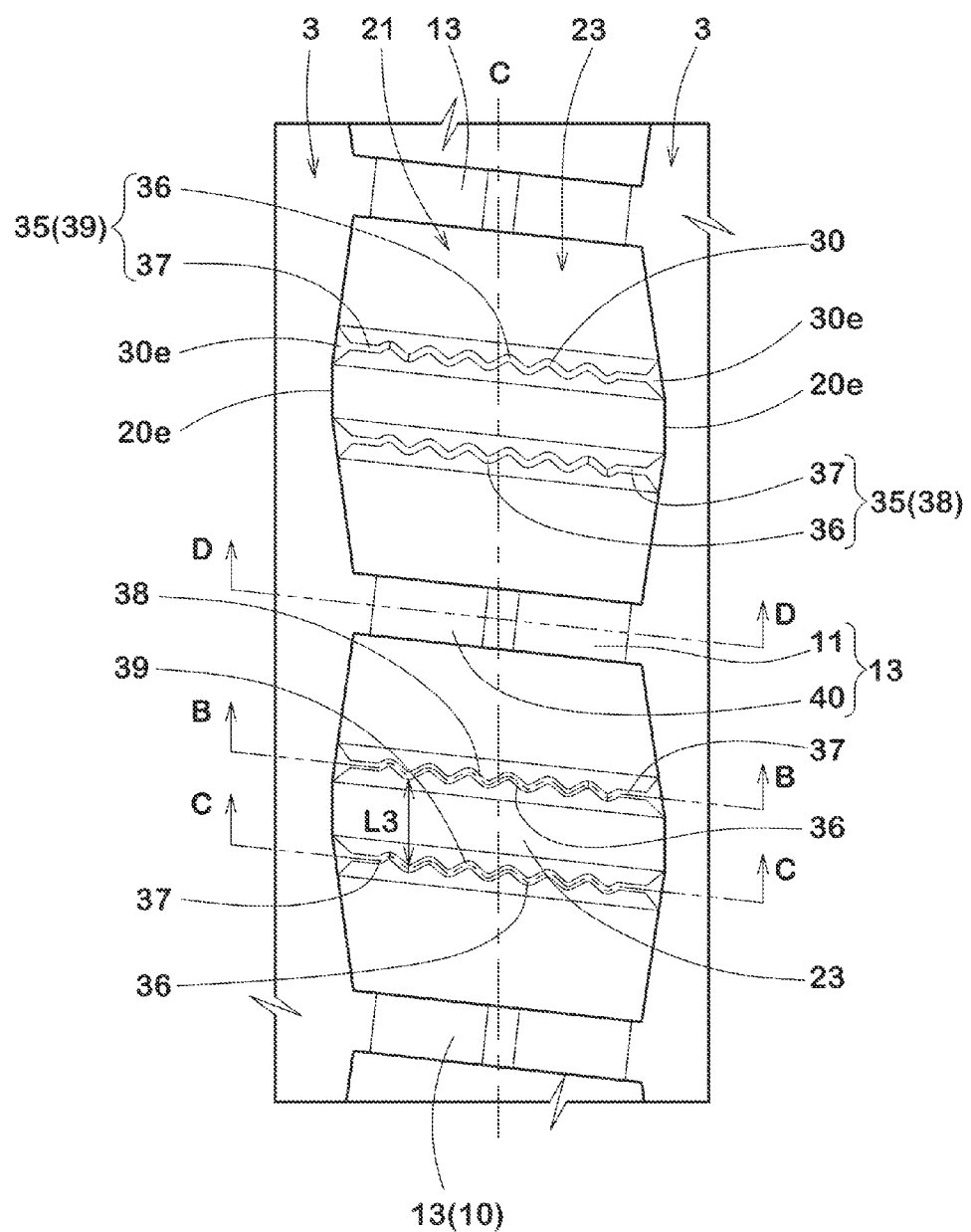
FIG. 4 is a top view of the center blocks of the tread portion shown in FIG. 1.

In the row 21 of the center blocks 23, as shown in FIG. 4, each block 23 is provided with one first variable depth sipe 38 and one second variable depth sipe 39.

The sipe-to-sipe circumferential distance L3 between the first variable depth sipe 38 and the second variable depth sipe 39 is constant along the tire axial direction in order that the rigidity distribution in the center block 23 becomes uniform, and thereby the heel-and-toe wear or uneven wear of the block can be improved.

The center block 23 in this example has lateral edges extending straight in parallel with each other and parallel with the inclining direction of the variable depth sipes, and circumferential edges curved convexly.

Figure 5:
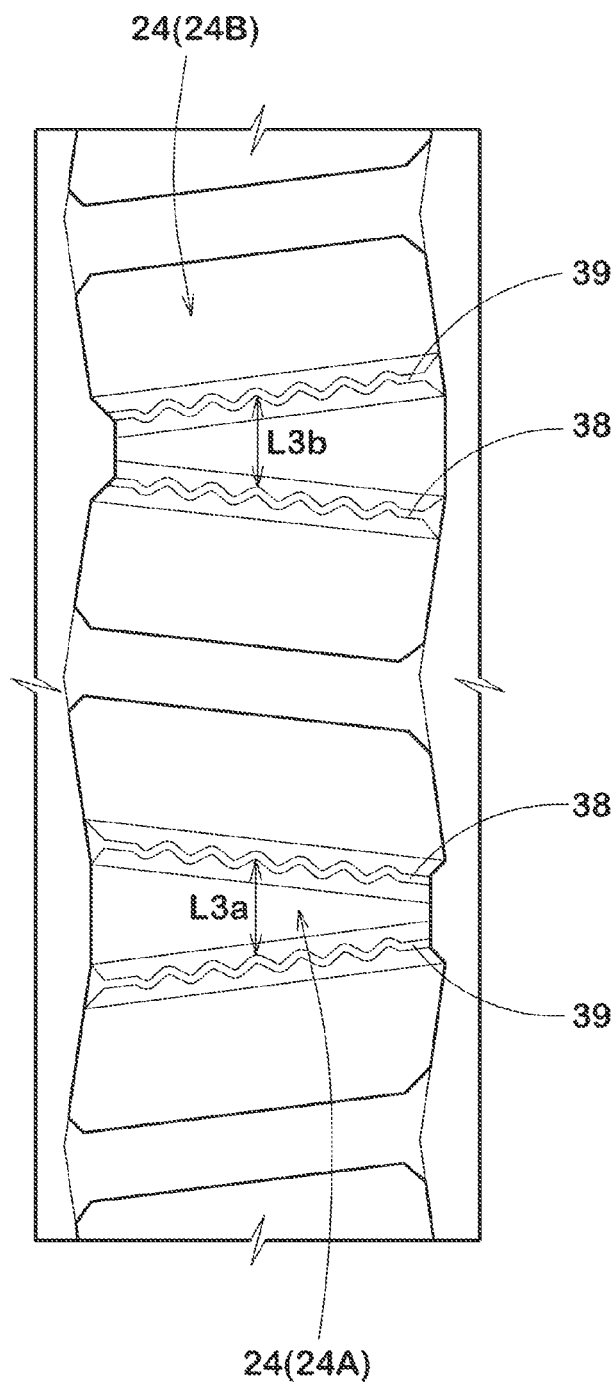
FIG. 5 is a top view of the middle blocks of the tread portion shown in FIG. 1.

In each row 21 of the middle blocks 24, as shown in FIG. 5, each block 24 is provided with one first variable depth sipe 38 and one second variable depth sipe 39.

The sipe-to-sipe circumferential distance L3 between the first variable depth sipe 38 and the second variable depth sipe 39 is gradually increased along the tire axial direction.

In this embodiment, the middle blocks 24 in each row 21 are first blocks 24A and second blocks 24B arranged alternately in the tire circumferential direction. The first block 24A is such that the sipe-to-sipe circumferential distance L3a is gradually increased toward the axially outside. The second block 24B is such that the sipe-to-sipe circumferential distance L3b is gradually decreased toward the axially outside so that the sipes exert their edge effect in multi directions and the steering stability especially on icy roads can be improved.

The middle block 24 has a lateral edge extending straight in parallel with the inclining direction of the adjacent variable depth sipe, a lateral edge extending straight in parallel with the inclining direction of the adjacent variable depth sipe, an axially outer circumferential edge curved concavely, and an axially inner circumferential edge curved convexly.

Figure 6:
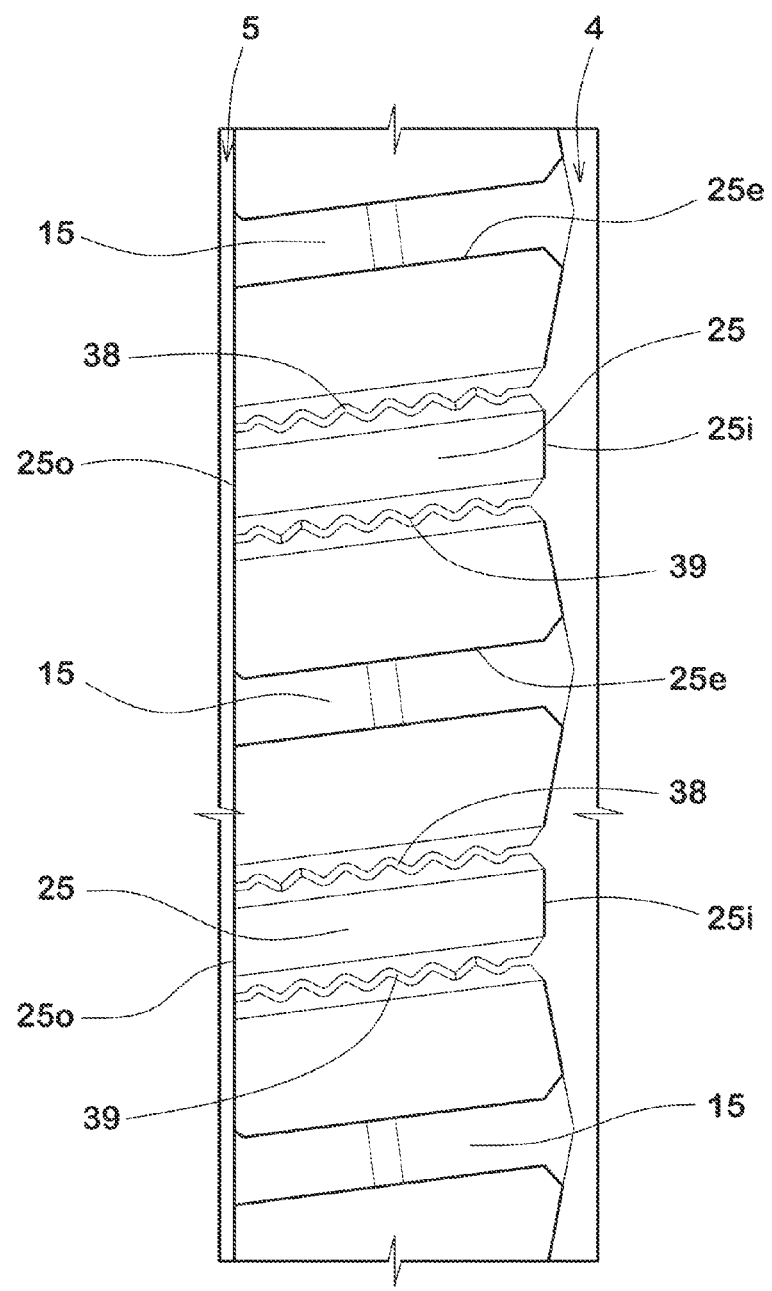
FIG. 6 is a top view of the inside shoulder blocks of the tread portion shown in FIG. 1.

In each row 21 of the inside shoulder blocks 25, as shown in FIG. 6, the blocks 25 are each provided with one first variable depth sipe 38 and one second variable depth sipe 39. The sipe-to-sipe circumferential distance L3 between the first variable depth sipe 38 and the second variable depth sipe 39 is constant along the tire axial direction in order that the rigidity distribution in the block 25 becomes uniform, and thereby the heel-and-toe wear or uneven wear of the block can be improved.

The inside shoulder block 25 has lateral edges 25e extending straight in parallel with each other, an axially outer circumferential edge 25o extending straight in parallel with the tire circumferential direction, and an axially inner circumferential edge 25i curved concavely.

The lateral edges 25e, the first variable depth sipe 38 and the second variable depth sipe 39 are inclined in the same direction with respect to the tire axial direction.

As a result, on-the-snow performance can be effectively improved by utilizing the shearing force of the snow packed into the inside shoulder axial grooves 15 and the middle main groove 4.

In this embodiment, the outside shoulder blocks 26 are provided with the semi-open sipes 30 (hereinafter the outside shoulder sipe 30s).

Figure 7:
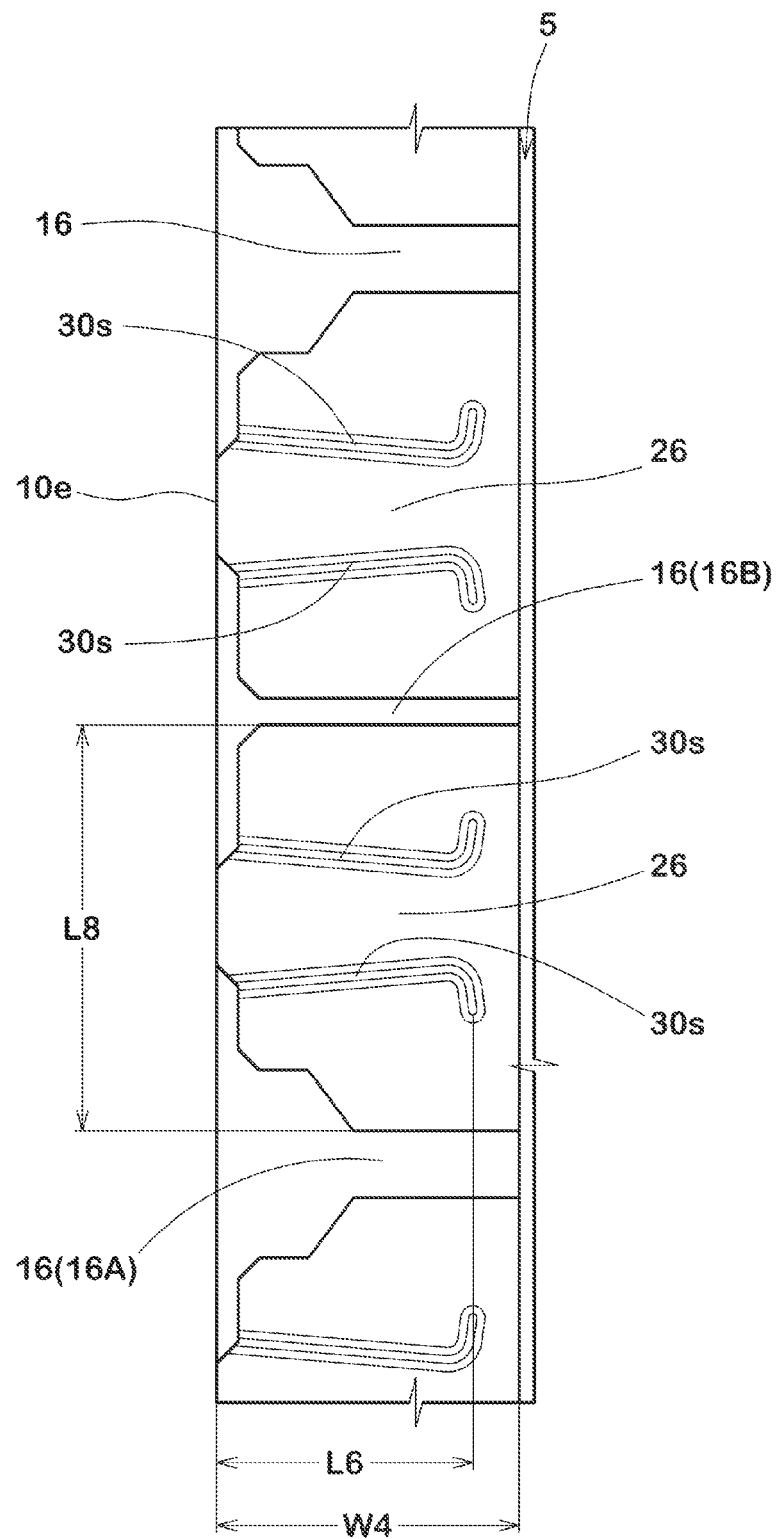
FIG. 7 is a top view of the outside shoulder blocks of the tread portion shown in FIG. 1.

In each row 21 of the outside shoulder blocks 26, as shown in FIG. 7, the outside shoulder axial grooves 16 circumferentially dividing the outside shoulder blocks 26 are: first outside shoulder axial grooves 16A having a variable groove width gradually increasing toward the axially outside; and second outside shoulder axial grooves 16B having a substantially constant groove width. The first outside shoulder axial grooves 16A and the second outside shoulder axial grooves 16B are arranged alternately in the tire circumferential direction.

The outside shoulder blocks 26 are each provided with a plurality of outside shoulder sipes 30s which extend axially inwardly from the axially outer circumferential edge 10e of the block 26 and terminate within the block 26 in order to increase the edges without decreasing the rigidity of the axially inside part of the block. Thus, the wear resistance and on-the-ice performance can be improved in a well balanced manner.

Preferably, the outside shoulder sipe 30s is bent toward the tire circumferential direction at a position near the axially inner closed end thereof in order to prevent damage such as crack liable to start from the closed end.
In this embodiment, the two outside shoulder sipes 30s disposed in each block 26 are bent toward the opposite directions.

The ratio L6/w4 of the axial length L6 of the outside shoulder sipe 30s to the axial width w4 of the outside shoulder block 26 is preferably set in a range of not less than 0.45, more preferably not less than 0.55, but not more than 0.65, more preferably not more than 0.60.
If the ratio L6/w4 is more than 0.65, there is a possibility that the wear resistance of the outside shoulder block 26 is decreased. If the ratio L6/w4 is less than 0.45, there is a possibility that wandering performance is deteriorated.

Preferably, the axial grooves 10 are provided with tie bars 40.

In this embodiment, the axial grooves 10 dividing the blocks provided with the variable depth sipes 35, that is, the center axial grooves 13, the middle axial grooves 14 and the inside shoulder axial grooves 15, are each provided with a tie bar 40.

Figure 8:
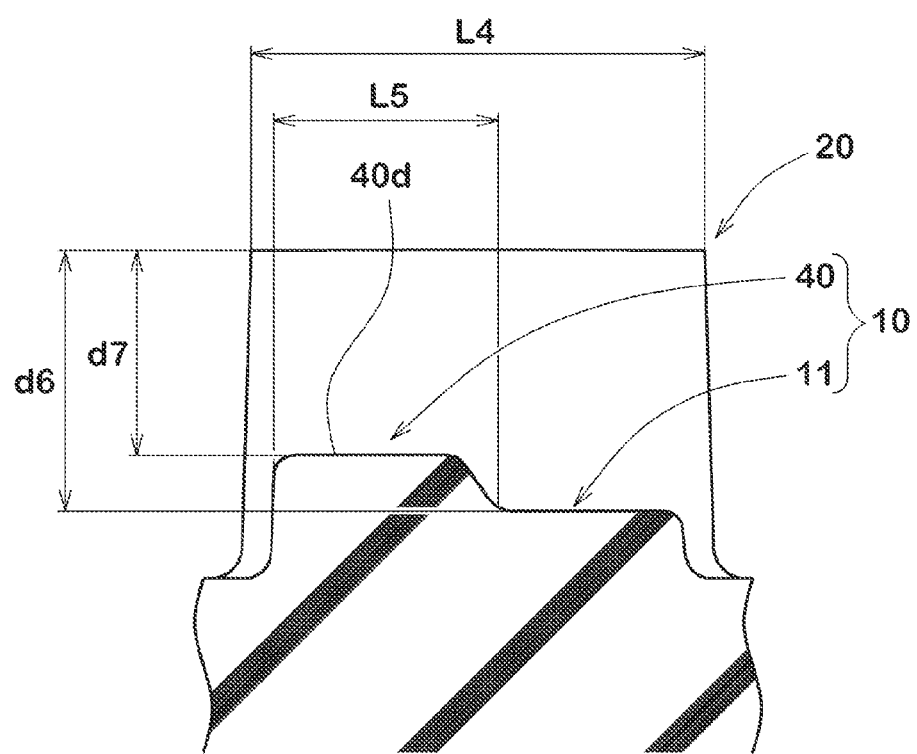
FIG. 8 is a cross sectional view taken along line D-D in FIG. 4 showing a tie bar.

The tie bar 40 protrudes from the groove bottom as shown in FIG. 8 and extends between the opposed groove sidewalls. By the tie bar 40, a shallow groove portion is formed in the axial groove 10, and accordingly, a deep main portion 11 is also formed.
The main portion 11 has a substantially constant depth d6. The ratio L5/L4 of the axial length L5 of the tie bar 40 to the entire axial length L4 of the axial groove 10 is preferably set in a range of not less than 0.30, more preferably not less than 0.45, but not more than 0.70, more preferably not more than 0.55. The depth d6 of the main portion 11 is preferably set in a range of not less than 0.75 times, more preferably not less than 0.78 times, but not more than 0.90 times, more preferably not more than 0.85 times the groove depth d1 of the crown main grooves 3. The ratio d7/d6 of the depth d7 at the tie bar 40 to the depth d6 of the main portion 11 is preferably set in a range of not less than 0.65, more preferably not less than 0.75, but not more than 0.95, more preferably not more than 0.85.

By configuring the main portion 11 as above, the axial groove 10 can exert good drainage performance while providing circumferential rigidity for the adjacent blocks, therefore, the steering stability can be improved without sacrificing the wet performance.

If the ratio d7/d6 is less than 0.65, the top face 40d of the tie bar 40 appears in the tread as a ground contacting face in an early stage of the tread wear life, therefore, the time period in which good on-the-ice performance can be obtained becomes short. If the ratio d7/d6 is more than 0.95 or the ratio L5/L4 is less than 0.30, it becomes difficult for the tie bar 40 to support the blocks and there is a possibility that the steering stability is deteriorated. If the ratio L5/L4 is more than 0.70, it becomes difficult for the axial groove 10 to provide good drainage.

As shown in FIG. 4, each tie bar 40 is aligned in the tire axial direction with (or overlaps in the tire axial direction with) the main portion 36 of the adjacent variable depth sipe 35 on each side of the tie bar 40 in the tire circumferential direction.
Preferably, the tie bar 40 does not overlap in the tire axial direction with the shallow portion 37 of the same variable depth sipe 35.
Further, it is preferable that the shallow portion 37 of the adjacent variable depth sipe 35 on one side of the tie bar 40 in the tire circumferential direction overlaps in the tire axial direction with the shallow portion 37 of the adjacent variable depth sipe 35 on the other side of the tie bar 40 in the tire circumferential direction.

Since the tie bar 40 is disposed near the main portion 36 of the sipe 30 around which the decrease in the rigidity is relatively large, and compensates for such decrease, the rigidity distribution in the block row 21 becomes uniform, and the wear resistance can be improved.
since the tie bar 40 does not overlap with the shallow portion 37, the rigidity distribution is further uniformed to further improve the wear resistance.

Figure 9:
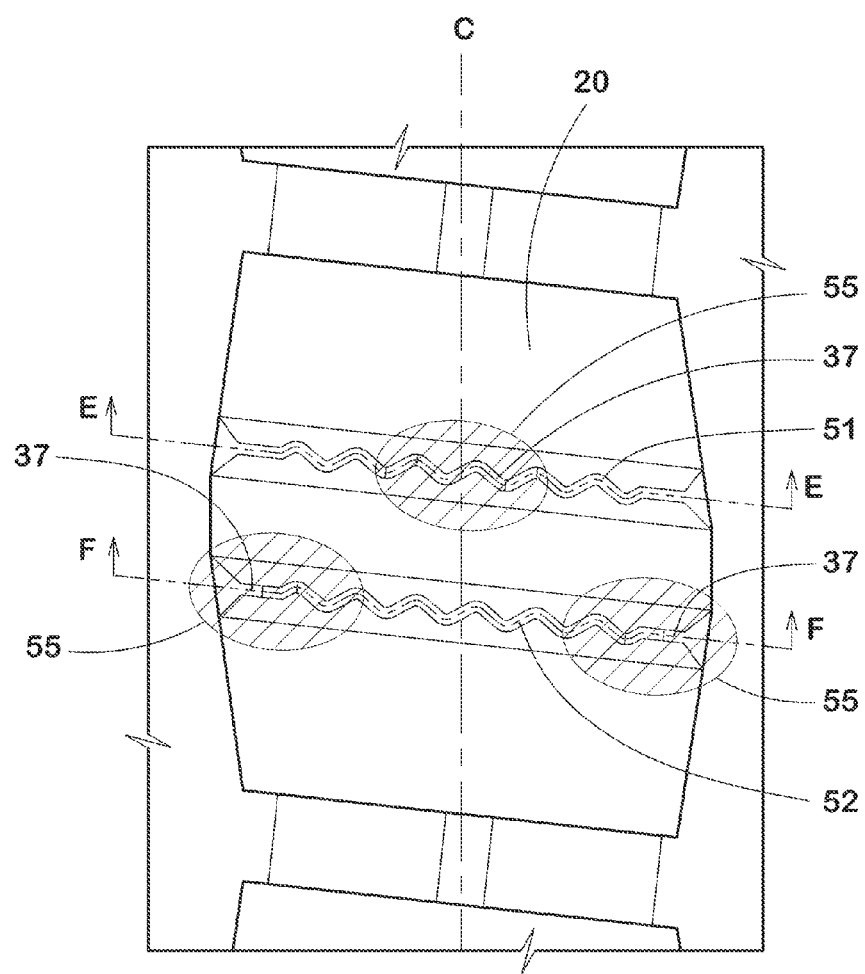
FIG. 9 is a top view of another example of the block provided with different types of the first and second variable depth sipes.
Figure 10A:
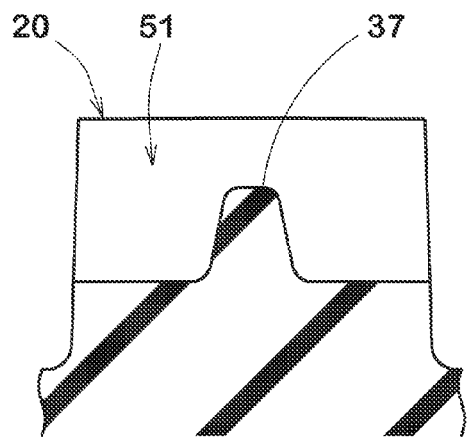
FIG. 10(a) is a cross sectional view taken along line E-E in FIG. 9.
Figure 10B:
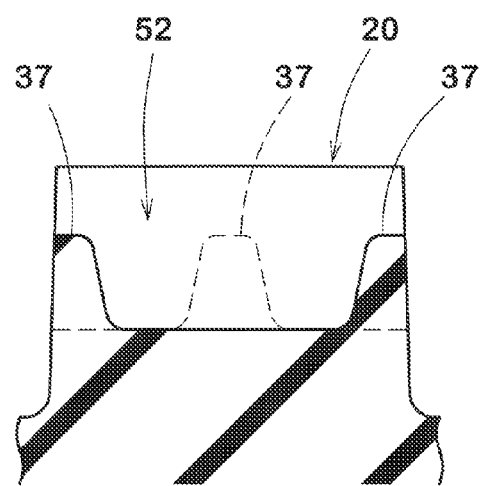
FIG. 10(b) is a cross sectional view taken along line F-F in FIG. 9.

FIG. 9 shows another example of the block 20 provided with two kinds of the variable depth sipes 35 (hereinafter, first variable depth sipe 51 and second variable depth sipe 52). The first variable depth sipe 51 is, as shown in FIG. 10(a), such that one shallow portion 37 is formed at the midpoint of the length of the sipe. The second variable depth sipe 52 is, as shown in FIG. 10(b), such that two shallow portions 37 are formed at both axial ends of the sipe.
The block 20 provided with the first variable depth sipe 51 and second variable depth sipe 52 are reinforced by the shallow portions 37, and the reinforced parts 55 are three parts. As a result, the torsional rigidity of the block is increased, and the steering stability during cornering can be improved.

In this embodiment, on both sides of each crown main groove 3, the center axial grooves 13 are circumferentially shifted from the middle axial grooves 14.

In this embodiment, on both sides of each middle main groove 4, the middle axial grooves 14 are circumferentially shifted from the inside shoulder axial grooves 15.

In the tread pattern shown in FIG. 1, on both sides of each shoulder narrow groove 5, the outside shoulder axial grooves 16 are aligned with the inside shoulder axial grooves 15 in order to improve the snow traction and drainage performance.

Figure 11:
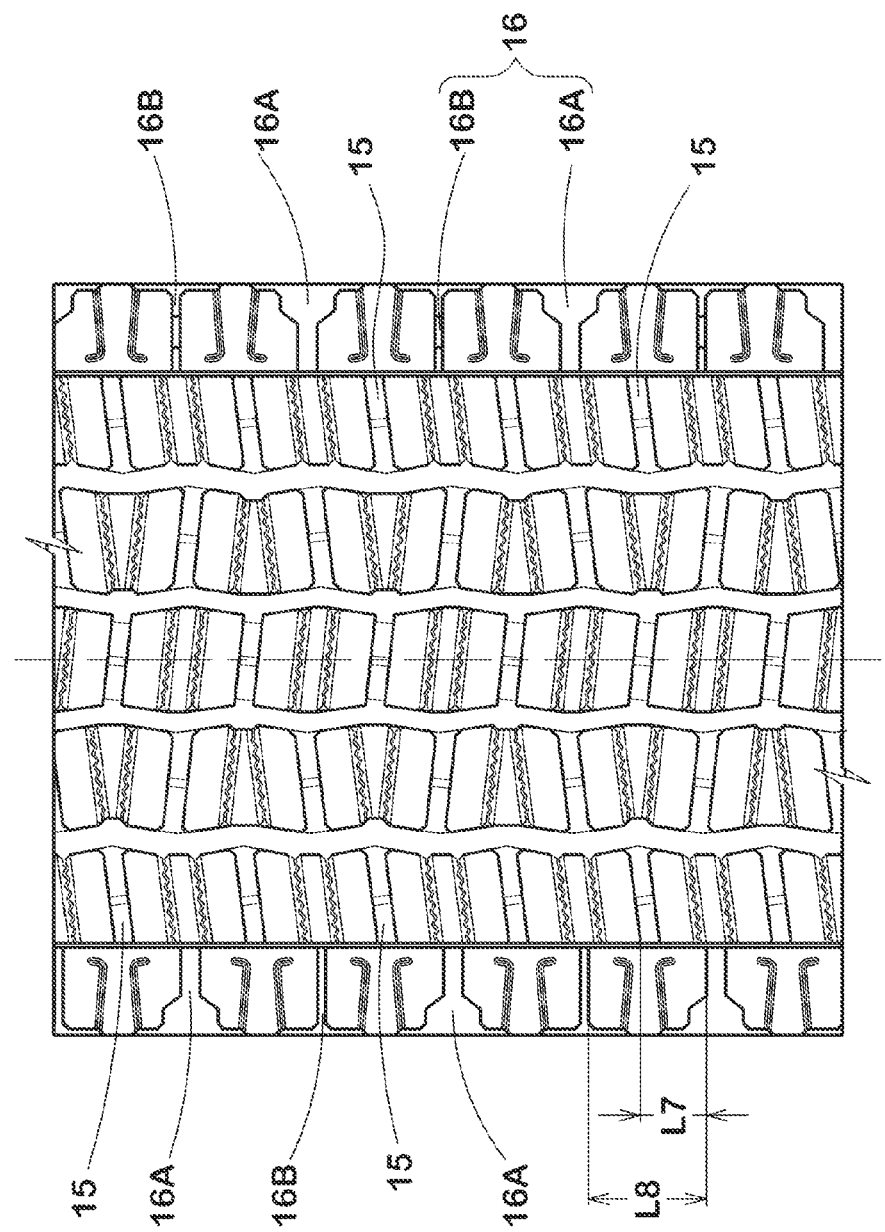
FIG. 11 is a developed partial view of a tread portion of a pneumatic tire according to the present invention.

In another example of the tread pattern shown in FIG. 11, on both sides of each shoulder narrow groove 5, the outside shoulder axial grooves 16 are circumferentially shifted from the inside shoulder axial grooves 15 in order to reduce partial deformation of the blocks and thereby to prevent the occurrence of heel-and-toe wear. The circumferential shift L7 therebetween is preferably not less than 0.30 times, more preferably not less than 0.35 times, but preferably not more than 0.55 times, more preferably not more than 0.50 times the circumferential length L8 of the outside shoulder block 26. The tread pattern shown in FIG. 11 differs in the circumferential shift otherwise the same as that shown in FIG. 1.

In the tread patterns shown in FIG. 1 and FIG. 11, lines drawn on both sides of the sipe 35 to extend parallel with the longitudinal direction of the sipe 35 are edges of a very shallow groove having a depth of 1 or 2 mm. In other words, the zigzag sipe 35 in this embodiment is formed in the bottom of such shallow straight groove.

As best shown in FIG. 7, a line drawn parallel with the edge of the semi-open sipe as the shoulder sipe 30s is also a groove edge of a very shallow semi-open groove having a depth of 1 or 2 mm. In other words, the semi-open bent sipe 30s in this embodiment is formed in the bottom of a semi-open type shallow bent groove.

Comparison Tests

Heavy duty pneumatic tires of size 11R22.5 (rim size 8.25×22.5) were experimentally manufactured. The tires had the same specifications except for specifications shown in Table 1 and Table 2.

using a 10 ton truck of which all wheels were provided with test tires inflated to 900 kPa and which was 50% loaded, the tires were tested for on-the-ice performance, on-the-snow performance, wear resistance, and wet performance with worn tread.

<On-the-ice Performance Test and on-the-snow Performance Test>

Test driver evaluated running performance on icy roads and running performance on showy roads. The results are indicated in Table 1 and Table 2 by an index based on respective Embodiment tires Ex.1 being 100, wherein the larger the value, the better the running performance.

<Wear Resistance Test>

After running on dry road for a predetermined distance, the amount of wear was measured. The results are indicated in Table 1 and Table 2 by an index based on respective Embodiment tires Ex.1 being 100, wherein the larger the value, the better the wear resistance.

<Wet Performance Test> using the truck with the test tires in a worn state in which the groove depth of the crown main grooves decreased to 20%, running performance on wet roads was evaluated by the test driver. The results are indicated in Table 1 and Table 2 by an index based on respective comparative example tires Ref.1 being 100, wherein the larger the value, the better the wet performance.

TABLE 1

| Tire | Ref. 1 | Ref. 2 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|---|---|---|---|---|---|---|
| tread pattern (FIG. no.) | 1 | 1 | 1 | 1 | 1 | 1 | 1 | 1 | 1 | 1 | 1 | 1 | 1 | 1 | 1 | 1 | 1 | 1 |
| land ratio Lr (%) | 76 | 76 | 76 | 76 | 76 | 76 | 76 | 76 | 76 | 76 | 76 | 76 | 76 | 76 | 76 | 76 | 76 | 76 |
| hardness Hb of blocks (deg.) | 67 | 67 | 67 | 67 | 67 | 67 | 67 | 67 | 67 | 67 | 67 | 67 | 67 | 67 | 67 | 67 | 67 | 67 |
| number Nb of blocks 37 | 78 | 78 | 78 | 78 | 78 | 78 | 78 | 78 | 78 | 78 | 78 | 78 | 78 | 78 | 78 | 78 | 78 | 78 |
| shallow portion 37 | none | none | | | | | | | | | | | | | | | | |
| L2/L1 | — | — | 0.08 | 0.10 | 0.17 | 0.27 | 0.17 | 0.17 | 0.17 | 0.17 | 0.17 | 0.17 | 0.17 | 0.17 | 0.17 | 0.17 | 0.17 | 0.17 |
| d4/d1 | 0.60 | 0.60 | 0.60 | 0.60 | 0.60 | 0.60 | 0.45 | 0.52 | 0.70 | 0.75 | 0.60 | 0.60 | 0.60 | 0.60 | 0.60 | 0.60 | 0.60 | 0.60 |
| d5/d4 | 0.25 | — | 0.25 | 0.25 | 0.25 | 0.25 | 0.25 | 0.25 | 0.25 | 0.25 | 0.20 | 0.28 | 0.25 | 0.25 | 0.25 | 0.25 | 0.25 | 0.25 |
| tie bar | none | | | | | | | | | | | | | | | | | |
| L5/L4 | — | 0.50 | 0.50 | 0.50 | 0.50 | 0.50 | 0.50 | 0.50 | 0.50 | 0.50 | 0.50 | 0.50 | 0.27 | 0.32 | 0.68 | 0.73 | 0.50 | 0.50 |
| d6/d1 | 0.80 | 0.80 | 0.80 | 0.80 | 0.80 | 0.80 | 0.80 | 0.80 | 0.80 | 0.80 | 0.80 | 0.80 | 0.80 | 0.80 | 0.80 | 0.80 | 0.80 | 0.65 |
| d7/d6 | — | 0.81 | 0.81 | 0.81 | 0.81 | 0.81 | 0.81 | 0.81 | 0.81 | 0.81 | 0.81 | 0.81 | 0.81 | 0.81 | 0.81 | 0.81 | 0.56 | 0.71 |
| circumferential shift L7 | — | 0 | 0 | 0 | 0 | 0 | 0 | 0 | 0 | 0 | 0 | 0 | 0 | 0 | 0 | 0 | 0 | 0 |
| on-the-ice performance | 97 | 100 | 100 | 100 | 100 | 93 | 90 | 100 | 100 | 100 | 100 | 100 | 93 | 100 | 100 | 100 | 90 | 100 |
| on-the-snow performance | 96 | 98 | 120 | 110 | 120 | 120 | 120 | 125 | 115 | 100 | 120 | 110 | 120 | 110 | 110 | 100 | 130 | 95 |
| wear resistance | 90 | 93 | 100 | 100 | 100 | 100 | 100 | 100 | 100 | 100 | 100 | 100 | 100 | 100 | 100 | 100 | 100 | 100 |
| wet performance | 100 | 98 | 100 | 100 | 100 | 100 | 100 | 100 | 100 | 100 | 100 | 100 | 100 | 100 | 100 | 100 | 100 | 100 |

| Tire | Ex. 17 | Ex. 18 | Ex. 19 | Ex. 20 | Ex. 21 | Ex. 22 | Ex. 23 | Ex. 24 | Ex. 25 | Ex. 26 | Ex. 27 | Ex. 28 | Ex. 29 | Ex. 30 | Ex. 31 | Ex. 32 |
|---|---|---|---|---|---|---|---|---|---|---|---|---|---|---|---|---|
| tread pattern (FIG. no.) | 1 | 1 | 1 | 1 | 1 | 1 | 1 | 1 | 1 | 1 | 1 | 1 | 1 | 1 | 1 | 1 |
| land ratio Lr (%) | 76 | 76 | 76 | 76 | 76 | 76 | 72 | 80 | 76 | 76 | 76 | 76 | 76 | 76 | 76 | 76 |
| hardness Hb of blocks (deg.) | 67 | 67 | 67 | 67 | 67 | 67 | 67 | 67 | 61 | 63 | 69 | 71 | 67 | 67 | 67 | 67 |
| number Nb of blocks 37 | 78 | 78 | 78 | 78 | 78 | 78 | 78 | 78 | 78 | 78 | 78 | 78 | 68 | 76 | 84 | 86 |
| shallow portion 37 | | | | | | | | | | | | | | | | |
| L2/L1 | 0.17 | 0.17 | 0.17 | 0.17 | 0.17 | 0.17 | 0.17 | 0.17 | 0.17 | 0.17 | 0.17 | 0.17 | 0.17 | 0.17 | 0.17 | 0.17 |
| d4/d1 | 0.60 | 0.60 | 0.60 | 0.60 | 0.60 | 0.60 | 0.60 | 0.60 | 0.60 | 0.60 | 0.60 | 0.60 | 0.60 | 0.60 | 0.60 | 0.60 |
| d5/d4 | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 |
| tie bar | | | | | | | | | | | | | | | | |
| L5/L4 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| d6/d1 | 0.65 | 0.80 | 0.65 | 0.80 | 0.80 | 0.65 | 0.65 | 0.65 | 0.65 | 0.65 | 0.65 | 0.65 | 0.65 | 0.65 | 0.65 | 0.65 |
| d7/d6 | 0.75 | 0.81 | 0.83 | 0.90 | 0.91 | 0.90 | 0.80 | 0.80 | 0.80 | 0.80 | 0.80 | 0.80 | 0.80 | 0.80 | 0.80 | 0.80 |
| circumferential shift L7 | 0 | 0 | 0 | 0 | 0 | 0 | 0 | 0 | 0 | 0 | 0 | 0 | 0 | 0 | 0 | 0 |
| on-the-ice performance | 100 | 100 | 100 | 100 | 100 | 100 | 95 | 100 | 100 | 100 | 100 | 90 | 95 | 100 | 100 | 100 |
| on-the-snow performance | 105 | 120 | 120 | 100 | 100 | 100 | 100 | 100 | 100 | 110 | 110 | 130 | 130 | 100 | 110 | 100 |
| wear resistance | 100 | 100 | 100 | 100 | 100 | 100 | 100 | 80 | 100 | 100 | 100 | 100 | 100 | 100 | 100 | 100 |
| wet performance | 100 | 100 | 100 | 100 | 100 | 80 | 100 | 100 | 100 | 100 | 100 | 100 | 100 | 100 | 100 | 100 |

TABLE 2

| Tire | Ref. 1 | Ref. 2 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|---|
| tread pattern (FIG. no.) | 11 | 11 | 11 | 11 | 11 | 11 | 11 | 11 | 11 | 11 | 11 | 11 | 11 | 11 | 11 |
| land ratio Lr (%) | 76 | 76 | 76 | 76 | 76 | 76 | 76 | 76 | 76 | 76 | 76 | 76 | 76 | 76 | 76 |
| hardness Hb of blocks (deg.) | 67 | 67 | 67 | 67 | 67 | 67 | 67 | 67 | 67 | 67 | 67 | 67 | 67 | 67 | 67 |
| number Nb of blocks | 78 | 78 | 78 | 78 | 78 | 78 | 78 | 78 | 78 | 78 | 78 | 78 | 78 | 78 | 78 |
| shallow portion 37 | none | | | | | | | | | | | | | | |
| L2/L1 | — | 0.17 | 0.08 | 0.10 | 0.17 | 0.27 | 0.17 | 0.17 | 0.17 | 0.17 | 0.17 | 0.17 | 0.17 | 0.17 | 0.17 |
| d4/d1 | 0.60 | 0.60 | 0.60 | 0.60 | 0.60 | 0.60 | 0.45 | 0.55 | 0.70 | 0.75 | 0.60 | 0.60 | 0.60 | 0.60 | 0.60 |
| d5/d4 | — | 0.25 | 0.25 | 0.25 | 0.25 | 0.25 | 0.25 | 0.25 | 0.25 | 0.25 | 0.18 | 0.21 | 0.31 | 0.58 | 0.25 |
| tie bar | none | none | | | | | | | | | | | | | |
| L5/L4 | — | — | 0.50 | 0.50 | 0.50 | 0.50 | 0.50 | 0.50 | 0.50 | 0.50 | 0.50 | 0.50 | 0.50 | 0.50 | 0.50 |
| d6/d1 | 0.80 | 0.80 | 0.80 | 0.80 | 0.80 | 0.80 | 0.80 | 0.80 | 0.80 | 0.80 | 0.80 | 0.80 | 0.80 | 0.80 | 0.80 |
| d7/d6 | — | — | 0.81 | 0.81 | 0.81 | 0.81 | 0.81 | 0.81 | 0.81 | 0.81 | 0.81 | 0.81 | 0.81 | 0.81 | 0.81 |
| outside shoulder sipe 30s | | | | | | | | | | | | | | | |
| L6/W4 | 0.55 | 0.55 | 0.55 | 0.55 | 0.55 | 0.55 | 0.55 | 0.55 | 0.55 | 0.55 | 0.55 | 0.55 | 0.55 | 0.55 | 0.55 |
| circumferential shift | | | | | | | | | | | | | | | |
| L7/L8 | 0.43 | 0.43 | 0.43 | 0.43 | 0.43 | 0.43 | 0.43 | 0.43 | 0.43 | 0.43 | 0.43 | 0.43 | 0.43 | 0.43 | 0.43 |
| on-the-ice performance | 97 | 100 | 100 | 100 | 100 | 93 | 90 | 100 | 100 | 100 | 95 | 100 | 100 | 100 | 100 |
| on-the-snow performance | 90 | 93 | 100 | 100 | 120 | 100 | 100 | 125 | 115 | 100 | 110 | 120 | 110 | 100 | 100 |
| wear resistance | 96 | 98 | 100 | 110 | 120 | 120 | 120 | 100 | 100 | 100 | 100 | 100 | 100 | 100 | 100 |
| wet performance | 100 | 98 | 100 | 100 | 100 | 100 | 100 | 100 | 100 | 100 | 100 | 100 | 100 | 100 | 100 |

| Tire | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Ex. 25 | Ex. 26 | Ex. 27 | Ex. 28 |
|---|---|---|---|---|---|---|---|---|---|---|---|---|---|---|---|
| tread pattern (FIG. no.) | 11 | 11 | 11 | 11 | 11 | 11 | 11 | 11 | 11 | 11 | 11 | 11 | 11 | 11 | 11 |
| land ratio Lr (%) | 76 | 76 | 76 | 76 | 76 | 76 | 76 | 76 | 76 | 76 | 76 | 76 | 76 | 76 | 76 |
| hardness Hb of blocks (deg.) | 67 | 67 | 67 | 67 | 67 | 67 | 67 | 67 | 67 | 67 | 67 | 67 | 67 | 67 | 67 |
| number Nb of blocks | 78 | 78 | 78 | 78 | 78 | 78 | 78 | 78 | 78 | 78 | 78 | 78 | 78 | 78 | 78 |
| shallow portion 37 | | | | | | | | | | | | | | | |
| L2/L1 | 0.17 | 0.17 | 0.17 | 0.17 | 0.17 | 0.17 | 0.17 | 0.17 | 0.17 | 0.17 | 0.17 | 0.17 | 0.17 | 0.17 | 0.17 |
| d4/d1 | 0.60 | 0.60 | 0.60 | 0.60 | 0.60 | 0.60 | 0.60 | 0.60 | 0.60 | 0.60 | 0.60 | 0.60 | 0.60 | 0.60 | 0.60 |
| d5/d4 | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 |
| tie bar | | | | | | | | | | | | | | | |
| L5/L4 | 0.32 | 0.68 | 0.73 | 0.50 | 0.50 | 0.50 | 0.50 | 0.50 | 0.50 | 0.50 | 0.50 | 0.50 | 0.50 | 0.50 | 0.50 |
| d6/d1 | 0.80 | 0.80 | 0.80 | 0.80 | 0.80 | 0.80 | 0.80 | 0.72 | 0.78 | 0.87 | 0.92 | 0.80 | 0.80 | 0.80 | 0.80 |
| d7/d6 | 0.81 | 0.81 | 0.81 | 0.81 | 0.63 | 0.91 | 0.96 | 0.90 | 0.83 | 0.74 | 0.70 | 0.81 | 0.81 | 0.81 | 0.81 |
| outside shoulder sipe 30s | | | | | | | | | | | | | | | |
| L6/W4 | 0.55 | 0.55 | 0.55 | 0.55 | 0.55 | 0.55 | 0.55 | 0.55 | 0.55 | 0.55 | 0.55 | 0.55 | 0.55 | 0.55 | 0.55 |
| circumferential shift | | | | | | | | | | | | | | | |
| L7/L8 | 0.43 | 0.43 | 0.43 | 0.43 | 0.43 | 0.43 | 0.43 | 0.43 | 0.43 | 0.43 | 0.43 | 0.27 | 0.32 | 0.53 | 0.58 |
| on-the-ice performance | 100 | 100 | 93 | 90 | 100 | 100 | 100 | 100 | 100 | 100 | 100 | 100 | 100 | 100 | 100 |
| on-the-snow performance | 100 | 100 | 100 | 100 | 100 | 100 | 100 | 100 | 100 | 100 | 100 | 100 | 100 | 100 | 100 |
| wear resistance | 110 | 110 | 120 | 120 | 120 | 120 | 120 | 90 | 120 | 105 | 95 | 110 | 120 | 115 | 110 |
| wet performance | 100 | 100 | 100 | 100 | 100 | 100 | 100 | 100 | 100 | 100 | 105 | 100 | 100 | 100 | 100 |

TABLE 2-continued

| Tire | Ex. 29 | Ex. 30 | Ex. 31 | Ex. 32 | Ex. 33 | Ex. 34 | Ex. 35 | Ex. 36 | Ex. 37 | Ex. 38 | Ex. 39 | Ex. 40 | Ex. 41 | Ex. 42 | Ex. 43 |
|---|---|---|---|---|---|---|---|---|---|---|---|---|---|---|---|
| tread pattern (FIG. no.) | 11 | 11 | 11 | 11 | 11 | 11 | 11 | 11 | 11 | 11 | 11 | 11 | 11 | 11 | 1 |
| land ratio Lr (%) | 76 | 76 | 76 | 76 | 72 | 80 | 76 | 76 | 76 | 76 | 76 | 76 | 76 | 76 | 76 |
| hardness Hb of blocks (deg.) | 67 | 67 | 67 | 67 | 67 | 67 | 67 | 67 | 67 | 67 | 61 | 63 | 69 | 71 | 67 |
| number Nb of blocks | 78 | 78 | 78 | 78 | 78 | 78 | 68 | 76 | 84 | 86 | 78 | 78 | 78 | 78 | 78 |
| shallow portion 37 | | | | | | | | | | | | | | | |
| L2/L1 | 0.17 | 0.17 | 0.17 | 0.17 | 0.17 | 0.17 | 0.17 | 0.17 | 0.17 | 0.17 | 0.17 | 0.17 | 0.17 | 0.17 | 0.17 |
| d4/d1 | 0.60 | 0.60 | 0.60 | 0.60 | 0.60 | 0.60 | 0.60 | 0.60 | 0.60 | 0.60 | 0.60 | 0.60 | 0.60 | 0.60 | 0.60 |
| d5/d4 | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 |
| tie bar | | | | | | | | | | | | | | | |
| L5/L4 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| d6/d1 | 0.80 | 0.80 | 0.80 | 0.80 | 0.65 | 0.65 | 0.65 | 0.65 | 0.65 | 0.65 | 0.65 | 0.65 | 0.65 | 0.65 | 0.65 |
| d7/d6 | 0.81 | 0.81 | 0.81 | 0.81 | 0.80 | 0.80 | 0.80 | 0.80 | 0.80 | 0.80 | 0.80 | 0.80 | 0.80 | 0.80 | 0.80 |
| outside shoulder sipe 30s | | | | | | | | | | | | | | | |
| L6/W4 | 0.42 | 0.47 | 0.63 | 0.68 | 0.55 | 0.55 | 0.55 | 0.55 | 0.55 | 0.55 | 0.55 | 0.55 | 0.55 | 0.55 | 0.55 |
| circumferential shift | | | | | | | | | | | | | | | |
| L7/L8 | 0.43 | 0.43 | 0.43 | 0.43 | 0.43 | 0.43 | 0.43 | 0.43 | 0.43 | 0.43 | 0.43 | 0.43 | 0.43 | 0.43 | 0 |
| on-the-ice performance | 93 | 100 | 100 | 103 | 95 | 100 | 95 | 100 | 100 | 100 | 100 | 100 | 100 | 95 | 100 |
| on-the-snow performance | 100 | 100 | 100 | 100 | 105 | 90 | 95 | 100 | 110 | 100 | 100 | 110 | 95 | 100 | 100 |
| wear resistance | 120 | 120 | 120 | 110 | 100 | 110 | 120 | 120 | 110 | 100 | 100 | 110 | 120 | 120 | 100 |
| wet performance | 100 | 100 | 100 | 100 | 100 | 100 | 100 | 100 | 100 | 100 | 100 | 100 | 100 | 100 | 100 |

The invention claimed is:

1. A pneumatic tire comprising:
a tread portion provided with circumferential grooves extending continuously in a tire circumferential direction and axial grooves connecting therewith so as to form a plurality of blocks,
the circumferential grooves comprising, on at least one side of a tire equator, an axially innermost crown main groove and a middle main groove disposed axially outwardly of the crown main groove to form a middle region therebetween,
the crown main groove extending in a zigzag manner comprising first corners protruding axially outwardly and second corners protruding axially inwardly which are arranged alternately in the tire circumferential direction,
the middle main groove extending in a zigzag manner comprising first corners protruding axially outwardly and second corners protruding axially inwardly which are arranged alternately in the tire circumferential direction, and
the axial grooves comprising a plurality of middle axial grooves extending from the first corners of the middle main groove to the first corners of the crown main groove.

2. The pneumatic tire according to claim 1,
wherein the axial grooves comprise a plurality of inside shoulder axial grooves extending axially outwardly from the second corners of the middle main groove to form a plurality of inside shoulder blocks.

3. The pneumatic tire according to claim 1,
wherein at least one of the plurality of blocks is provided with a first variable depth sipe and a second variable depth sipe each having both axial ends opened at edges of the block on both sides thereof in the tire axial direction, and each having a deep main portion having a substantially constant depth and a shallow portion, and
in the at least one of the plurality of blocks, the shallow portion of the first variable depth sipe overlaps, in the tire axial direction, with the deep main portion of the second variable depth sipe.

4. The pneumatic tire according to claim 3,
wherein the at least one of the plurality of blocks is divided by a pair of the middle axial grooves in the middle region.

5. The pneumatic tire according to claim 3,
wherein the sipe-to-sipe circumferential distance between the first variable depth sipe and the second variable depth sipe varies along the tire axial direction.

6. The pneumatic tire according to claim 3,
wherein the sipe-to-sipe circumferential distance between the first variable depth sipe and the second variable depth sipe is gradually increased toward the axially outside.

7. The pneumatic tire according to claim 3,
wherein the sipe-to-sipe circumferential distance between the first variable depth sipe and the second variable depth sipe is gradually decreased toward the axially outside.

8. The pneumatic tire according to claim 2,
wherein a pair of the middle axial grooves circumferentially adjacent is inclined in an opposite direction with respect to the tire axial direction from each other and each of the inside shoulder axial grooves is inclined in a same direction with respect to the tire axial direction.

9. A pneumatic tire comprising:
a tread portion provided with circumferential grooves extending continuously in a tire circumferential direction and axial grooves connecting therewith so as to form a plurality of blocks,
the circumferential grooves comprising, on at least one side of a tire equator, an axially innermost crown main groove and a middle main groove disposed axially outwardly of the crown main groove to form a middle region therebetween,
the middle main groove extending in a zigzag manner comprising first corners protruding axially outwardly and second corners protruding axially inwardly which are arranged alternately in the tire circumferential direction, and
the axial grooves comprising a plurality of middle axial grooves extending from the first corners of the middle main groove to the crown main groove and a plurality of inside shoulder axial grooves extending axially outwardly from the second corners of the middle main groove to form a plurality of inside shoulder blocks,
wherein at least one of the plurality of blocks is provided with a first variable depth sipe and a second variable depth sipe each having both axial ends opened at edges of the block on both sides thereof in the tire axial direction, and each having a deep main portion having a substantially constant depth and a shallow portion, and in the at least one of the plurality of blocks, the shallow portion of the first variable depth sipe overlaps, in the tire axial direction, with the deep main portion of the second variable depth sipe, and
wherein a pair of the middle axial grooves circumferentially adjacent is inclined in an opposite direction with respect to the tire axial direction from each other and each of the inside shoulder axial grooves is inclined in a same direction with respect to the tire axial direction.

10. The pneumatic tire according to claim 9,
wherein the crown main groove extends in a zigzag manner comprising first corners protruding axially outwardly and second corners protruding axially inwardly which are arranged alternately in the tire circumferential direction, and the plurality of middle axial grooves extends to the first corners of the crown main groove.

* * * * *